United States Patent [19]

Sudare et al.

[11] Patent Number: 4,908,557
[45] Date of Patent: Mar. 13, 1990

[54] RUNNING CONTROL METHOD AND APPARATUS OF THE AUTOMATIC GUIDED VEHICLES

[75] Inventors: Masahiro Sudare, Osaka; Hisao Tomikawa, Takatsuki; Mamoru Minami, Daito, all of Japan

[73] Assignee: Mitsubishi Denki Kabushiki Kaisha, Japan

[21] Appl. No.: 258,548

[22] Filed: Oct. 17, 1988

[30] Foreign Application Priority Data

Mar. 31, 1988 [JP] Japan .................................. 63-80904

[51] Int. Cl.⁴ .............................................. G05D 1/00
[52] U.S. Cl. .................................. 318/587; 318/139; 180/168; 180/169; 364/424.02
[58] Field of Search ....................... 318/587, 139, 568; 180/167, 168, 169; 446/175, 444, 445; 364/424.01, 424.02, 424.04, 513; 358/103, 108; 901/1, 50, 46, 47

[56] References Cited

U.S. PATENT DOCUMENTS

| 4,010,409 | 3/1977 | Waites | 318/587 |
|---|---|---|---|
| 4,253,541 | 3/1981 | Iida et al. | 318/587 X |
| 4,310,789 | 1/1982 | Mank et al. | 318/587 |
| 4,322,670 | 3/1982 | Taylor | 318/587 |
| 4,361,202 | 11/1982 | Minovitch | 180/168 |
| 4,472,716 | 9/1984 | Hansen | 318/587 X |
| 4,593,238 | 6/1986 | Yamamoto | 180/169 X |
| 4,593,239 | 6/1986 | Yamamoto | 180/169 X |
| 4,613,804 | 9/1986 | Swenson | 318/587 |
| 4,658,928 | 4/1987 | Seo | 318/139 X |
| 4,711,316 | 12/1987 | Katou et al. | 318/587 X |
| 4,777,601 | 10/1988 | Boegli | 180/168 X |
| 4,811,229 | 3/1989 | Wilson | 180/169 X |

Primary Examiner—William M. Shoop, Jr.
Assistant Examiner—Paul Ip
Attorney, Agent, or Firm—Townsend & Townsend

[57] ABSTRACT

This invention relates to a running control apparatus and method for calculating the running positions and directions of the automatic guided vehicle in response to detected outputs of the magnetic field intensity of magnets arranged at fixed points on the running course in two-dimension by being detected for several times at a predetermined timing by a plurality of magnetic detecting elements which are aligned in a direction intersecting the moving direction of the vehicle, correcting said running positions and directions, and controlling the automatic guided vehicle.

5 Claims, 10 Drawing Sheets

Fig. 12

| ADDRESS | X | Y |
|---|---|---|
| Abrs 1 | $X_{M8}$ | $Y_{M8}$ |
| Abrs 2 | $X_{M7}$ | $Y_{M7}$ |
| Abrs 3 | $X_{M6}$ | $Y_{M6}$ |
| Abrs 4 | $X_{M5}$ | $Y_{M5}$ |

Fig. 11

| ADDRESS | X | Y |
|---|---|---|
| Abrs 1 | $X_{M1}$ | $Y_{M1}$ |
| Abrs 2 | $X_{M2}$ | $Y_{M2}$ |
| Abrs 3 | $X_{M3}$ | $Y_{M3}$ |
| ---------- | ---------- | ---------- |
| Abrs 23 | $X_{M23}$ | $Y_{M23}$ |
| Abrs 24 | $X_{M24}$ | $Y_{M24}$ |

RUNNING CONTROL METHOD AND APPARATUS OF THE AUTOMATIC GUIDED VEHICLES

BACKGROUND OF THE INVENTION

1. Field of the Invention

The present invention relates to a running control method and apparatus which runs an automatic guided vehicle as correcting its running position and direction by fixed points set on running courses.

2. Description of the Prior Art.

Automatic guided trackless vehicle which travels on the floor in a plant without attendant being developed and realized. There are two running systems as the running control system of the automatic guided vehicle, namely, an induction type and self-control type. The induction type travels automatically on the running course guided on optical reflecting tapes or wires energized with an electric current. The self-control type travels automatically in response to the running distance and direction of the running courses stored before traveling.

For the induction type, guides set as the running course must be checked and it was difficult to change the course.

While, aforesaid problems encountered by the induction type can be solved by the self-control type such that, for example, an operation unit for accumulating and operating pulses responsive to revolutions of left and right wheels is installed on the automatic guided vehicle, which is set at a starting position on the course, the number of pulses are counted successively simultaneously with the start of traveling to detect the position and direction of the vehicle, thereby guiding the vehicle to correspond to the running course stored in advance and to correct the position and direction at fixed points on the way to solve accumulated traveling errors.

As the prior art of self-control type, an optical system using an image pick-up device such as an ITV or the like and a magnet system invented by us (Japanese Patent Application No. 59-135514) are well known.

In the optical system, fixed points such as bar codes indicating coordinates positions of the plant are stuck to the floor surface, which are recognized by the image pick-up device to correct the running position and direction.

In the optical system, however, the fixed points stuck to the floor surface are subject to stains and influenced by ambient quantity of light, results in incorrect detection.

In addition, the ITV and its image processing devices are expensive and processing time is long, thus its application has been restricted.

Such problems of optical system may be solved by the magnet system mentioned hereinabove. In the aforesaid invention, a plurality of hall elements which detect the magnetic field intensity of magnets disposed at fixed points on the running course are aligned in a direction intersecting the moving direction of the vehicle, and since polarity differentials exist in outputs of the hall elements between left and right of the border right above the magnet, the relative position of the magnet and hall elements is calculated by detecting its variation point to correct the driving position and direction of the automatic guided vehicle.

In the invention aforementioned, however, since a plurality of hall elements are scanned serially by a CPU to detect the magnetic field intensity while traveling, detecting positions are differed for every hall element, and in practice, data are detected obliquely to the magnet, thus there was a fear that detecting errors of the magnetic field intensity may occur. When the magnetic field intensity is detected by one scanning while traveling, it is difficult to scan right above the magnet, and furthermore due to causes such as external noises, partial characteristic deteriorations and damages of hall elements or unstable outputs attributable to power fluctuations, malfunctions may be triggered.

SUMMARY OF THE INVENTION

The present invention has been devised in view of the above-mentioned problems, therefore, it is an object thereof to provide a running control method and apparatus capable of reducing detecting errors and malfunctions by repeating scanning of the magnets by hall elements for several times in front and after thereof to detect the position of said magnets in two-dimension.

The above and further objects and features of the invention will more fully be apparent from the following detailed description with accompanying drawings.

BRIEF DESCRIPTION OF THE DRAWINGS

FIG. 11 is a concept view showing the content of memory of a RAM attached to the second CPU, and FIG. 12 is a concept view showing the content of memory of a RAM in the state sorted by setting of the running courses.

DESCRIPTION OF THE PREFERRED EMBODIMENTS

The present invention will be described in detail with reference to the drawings showing its embodiment as follows.

Figure 1:
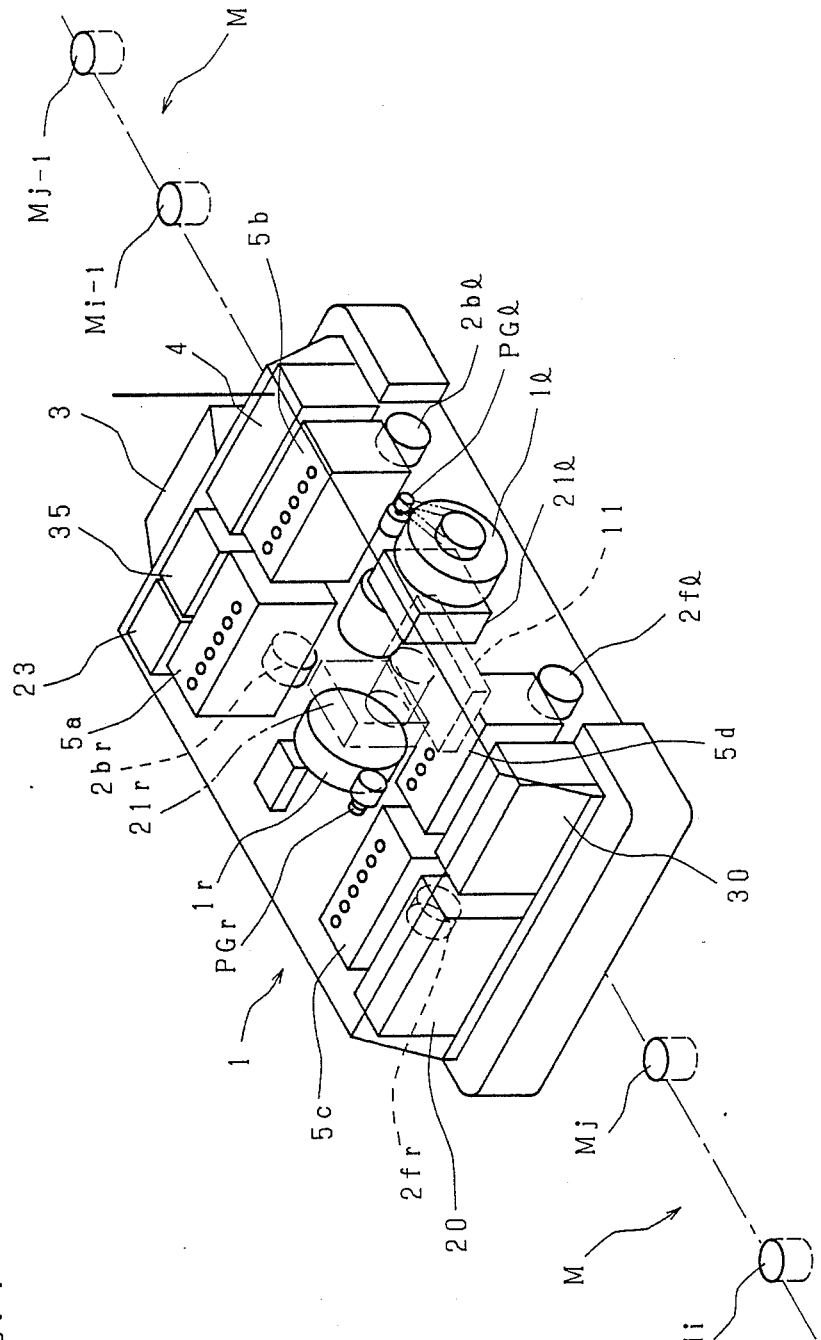
FIG. 1 is a perspective view of an automatic guided vehicle showing one example of the present invention.
Figure 2:
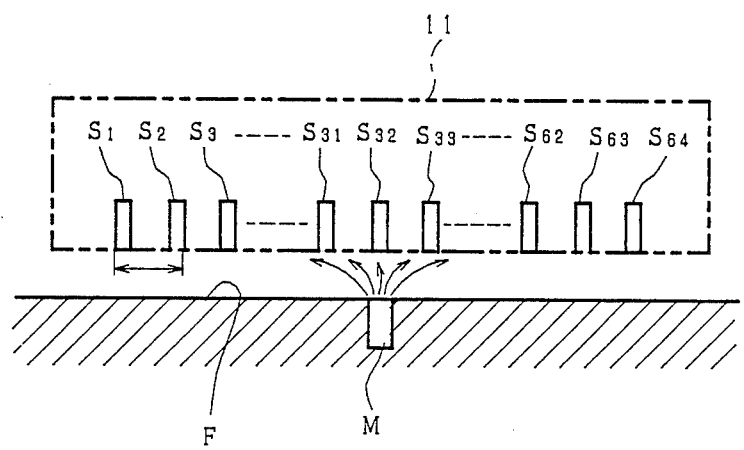
FIG. 2 is a schematic front view showing a configuration of a magnetic detecting device.

FIG. 1 is a perspective view of an automatic guided vehicle equipped with a running control apparatus (hereinafter referred to as the present apparatus) according to the present invention, wherein numeral 1 denotes a vehicle supported on a pair of driving wheels $1l$, $1r$ and casters $2fl$, $2fr$, $2bl$, $2br$ arranged in front, rear, right and left. The driving wheels $1l$, $1r$ are coupled directly to motors $21l$, $21r$ and are rotatable independently. Pulse generators $PGl$, $PGr$ for producing pulses responsive to respective revolutions are attached to the motors $21l$, $21r$. FIG. 2 is a schematic front view showing a configuration of a magnetic detecting device, wherein on the center lower surface of the vehicle 1, the magnetic detecting device 11 comprising 64 hall elements $S_1, S_2 \ldots S_{64}$ as magnetic detecting elements which are aligned linearly in both directions intersecting the moving direction of the vehicle 1, is disposed with its center corresponding to that of the vehicle 1 to detect relative positions of the vehicle 1 and fixed points M, M . . . consisting of a pair of cylindrical magnets Mj,i (among a pair of magnets Mj,i, the magnet positioned in the front of moving direction of the vehicle 1 is indicated at Mj and the one in the rear is indicated at Mi) embedded in the floor F on the running course at a predetermined distance. On the vehicle 1, there are provided four batteries 5a, 5b, 5c, 5d as power sources, a control panel 3 for setting the running course of the vehicle and for operating manual traveling, a wireless communication module 4 for effecting communications between the vehicle and outside, a detecting circuit 30 for processing outputs of the magnetic detecting device 11, operation control circuit 20 for controlling the driving wheels 1l, 1r, CPU 35 for controlling the detecting circuit 30 and CPU 23 for the operation control circuit 20.

Next, a method for calculating relative positions of fixed points M, M . . . and the vehicle 1 which is essential points of the present invention will be described.

Figure 3:
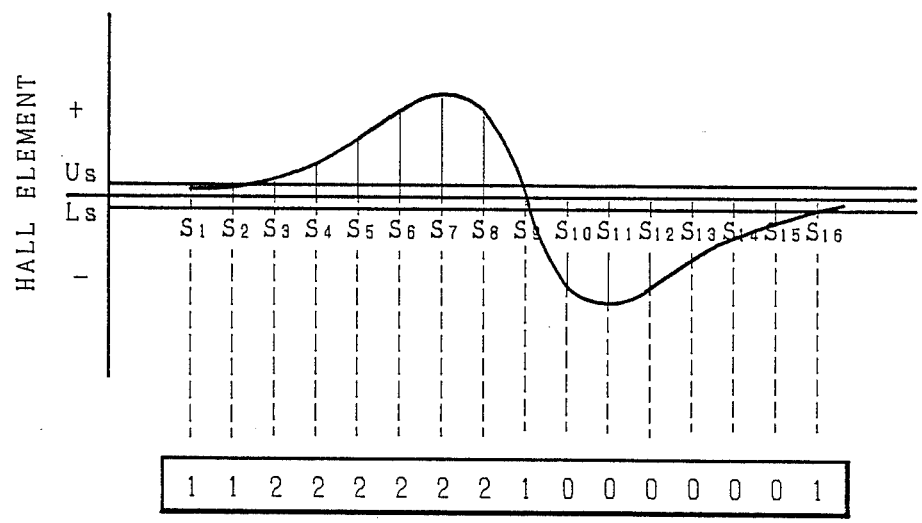
FIG. 3 is a graph showing the relationship between hall elements and their outputs.

FIG. 3 is a graph showing relationships between hall elements $S_1, S_2 \ldots$ and their outputs, wherein the outputs are plotted along the ordinate and the hall elements along the abscissa. For the purpose of simplifying the explanation, the number of hall elements is reduced to 16.

When respective outputs of Di of each hall element $S_1, S_2 \ldots$ is detected, this output Di is compared with the upper threshold value Us or lower threshold value Ls, and ternarized by following Equations (1) to (b 3).

$$D_i \geq U_s \ldots \text{high level } (=2) \tag{1}$$

$$L_s < D_i < U_s \ldots \text{medium level } (=1) \tag{2}$$

$$D_i \leq L_s \ldots \text{low level } (=0) \tag{3}$$

Ternarizings are performed at every time when the magnetic field intensities of the magnets Mj, Mi are detected such that, the CPU 23 calculates by revolutions of the driving wheels 1l, 1r that the vehicle 1 has approached to about 70 mm before the magnets Mj and Mi of the fixed points M, M . . . , and outputs the approaching signal to the CPU 35, which scans the hall elements $S_1, S_2 \ldots$ 10 times at every movement of the vehicle of 15 mm in order from the hall elements $S_1$ to $S_{16}$.

Figure 4:
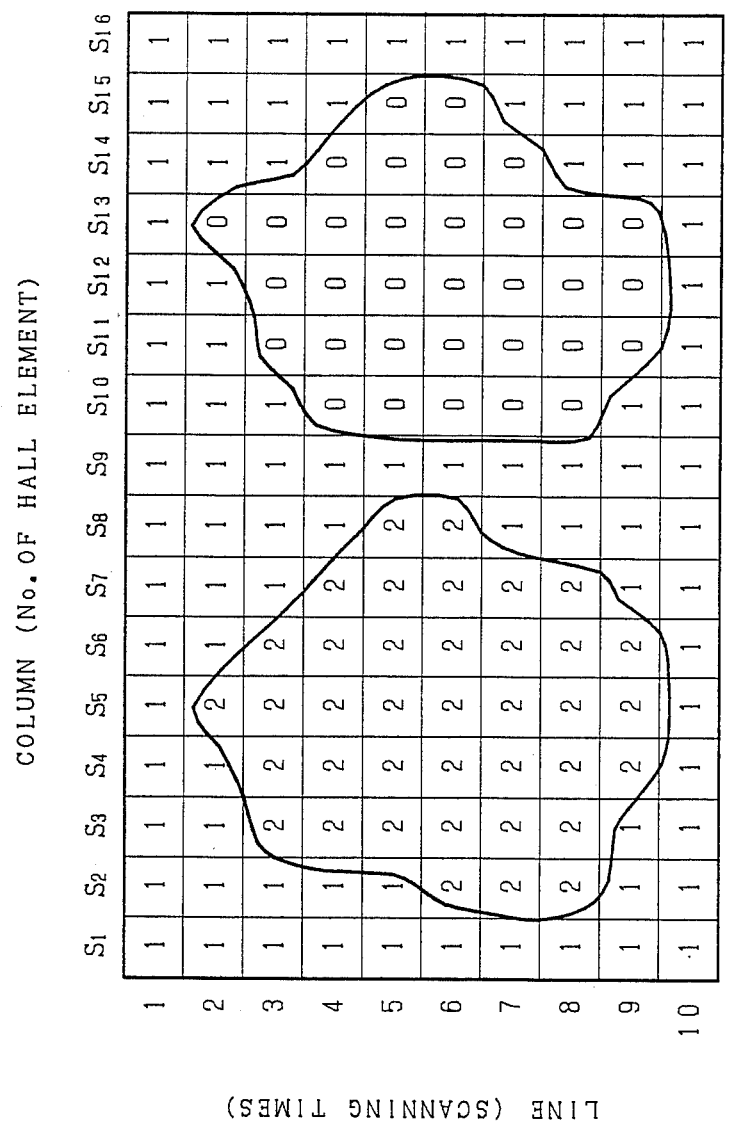
FIG. 4 is a view showing outputs of hall elements ternarized at every scanning.

FIG. 4 shows outputs of each hall element ternarized at every scan, wherein the line indicates the number of scans and the row indicates hall element numbers. Fifth row in FIG. 4 shows the case of FIG. 3.

As shown by solid lines in FIG. 4, when the vehicle 1 passes near the magnets Mj and Mi, a high level region and a low level region appear, but when the vehicle 1 passes the position spaced from the magnets Mj and Mi, a unilateral region including a medium or high level (or low level) or no region is appeared.

When the regions in which high (or low) elements and its counter elements are gathered separately are present for one line, the abscissa at the center point between two regions is obtained and distance between both ends of the two regions is obtained. When only the unilateral region is present, the abscissa of left and right ends of said region on the line is obtained to renew the existing left and right limit values. When gathered regions are not formed the next line is processed without any renewal.

Figure 5:
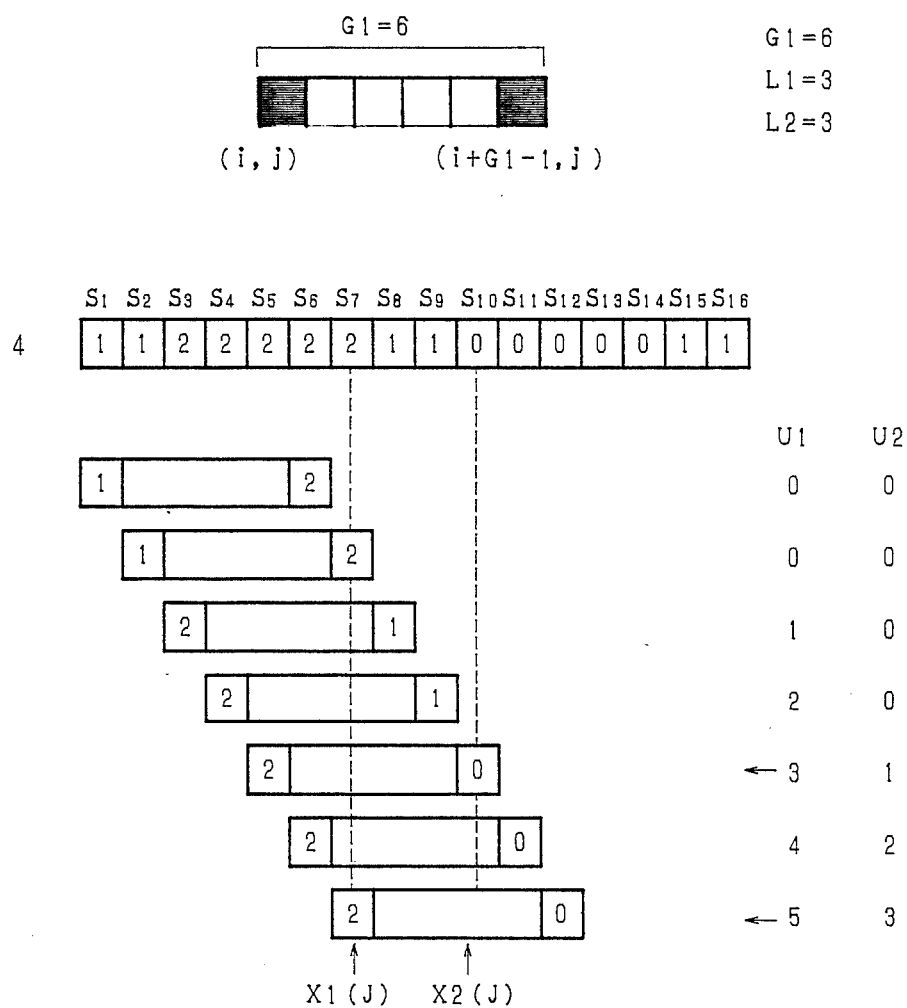
FIG. 5 is a view showing algorithm for obtaining the center position.

FIG. 5 illustrates the fact described hereinabove and shows algorithm for obtaining the abscissa of the center of 4th line in FIG. 4.

For effecting aforesaid processings, a window having a predetermined length G1 (in this embodiment G1=6) is used. The window is shifted from the left end of each line by one row to read left end and right end data of the window, when the high (or low) level data A (or B) is present at the left end, since the left end of the region is detected then, the region appearance frequency U1 is set at 1 (FIG. 5 shows the 3rd shift). Unilateral region lower limit value L1 (in the present embodiment L1=3) of continuous appearance frequency of the region appearance frequency U1 is set in advance, and when there is data A (or B) at the left end in next shift, the region appearance frequency U1 is increased by 1. When the unilateral region lower limit value L1 corresponds to the region appearance frequency U1, it is determined that the unilateral region is formed. When the high (or low) level data A (or B) is read at the left end and its counter data B (or A) is read at the right end, since a high and low pair has appeared once and two regions are detected, the region pair appearance frequency U2 is set at 1 (FIG. 5 shows the 5th shift). The two-region lower limit value L2 of continuous appearance frequency of the region pair appearance frequency U2 is set in advance (in the present embodiment L2=3), and when the data A and B are present in a pair at both ends of the data in the next shift, the region pair appearance frequency U2 is increased by 1 . When the region pair appearance frequency U2 corresponds to two-region low limit value L2, the window shift is finished. When the window shift and 10 times scannings are completed, the right end coordinates X1(J) of the left side region of each line number J, and the left end coordinates X2(J) of the right side region are obtained (in 4th line of the present embodiment X1(4)=7, X2(4)=10).

When the coordinates X1(J), X2(J) of each line number J are obtained, a line number having the shortest distance $D_{min}$ between two regions is obtained.

Since the distance D between the two regions can be obtained from $$D = X2(J) - X1(J) \tag{4},$$

the line number E where the distance D is the shortest distance $D_{min}$ is obtained. When a plurality of lines having the same shortest distance $D_{min}$ appear, its start line number E0 and end line number E1 are stored, and its mean value $$Y1 = (E0 + E1)/2$$

as well as a mean value $$Z1 = (Z(E0) = Z(E1))/2$$

of respective center coordinates Z(E0), Z(E1), $$Z(E0) = (X1(E0) + X2(E0))/2$$

$$Z(E1)=(X1(E1)+X2(E1))/2$$

are obtained. MP(Z1,Y1) becomes the center point of two regions in two-dimensional plane.

For example, in an example shown in FIG. 4, shortest distance $D_{min}=1$, start line number E0=5, end line number E1=6, mean value Y1=5.5, center coordinates $$Z(E0)=(8+10)/2=9,$$

$$Z(E1)=(8+10)/2=9,$$

mean value Z1=9.

Mean value Z1 of the center coordinates is obtained for each magnet Mj and Mi by the aforesaid operation algorithm to correct position of the vehicle 1.

Figure 6:
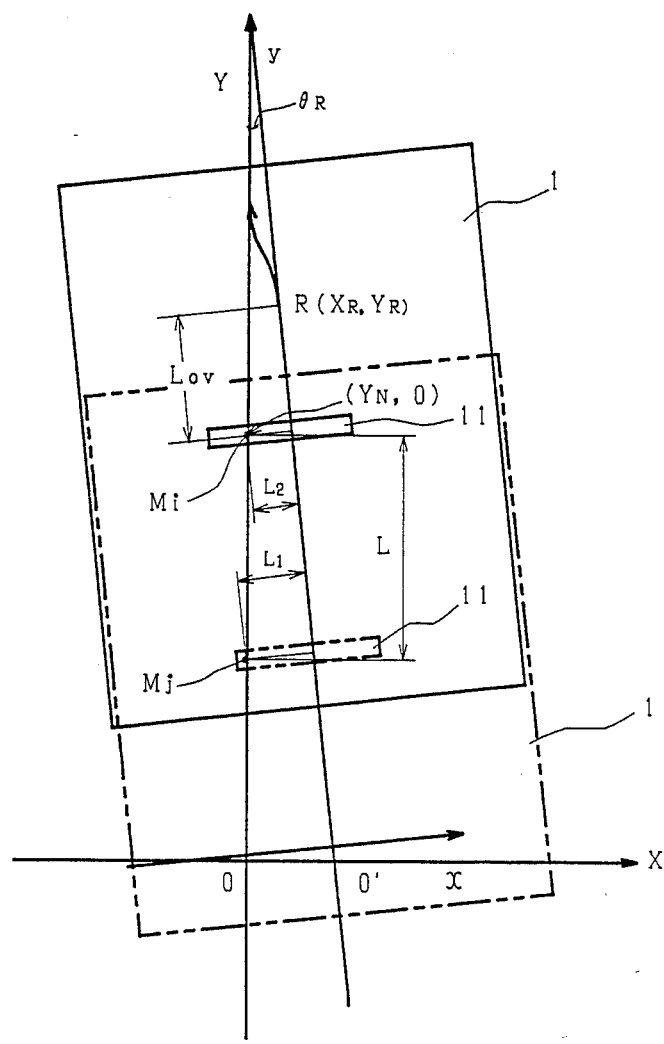
FIG. 6 is a view showing the relationship between a vehicle and its running course at fixed points.

FIG. 6 shows relationships between the vehicle and running course when the vehicle passes the fixed point M, course wherein Y-axis denotes the moving direction of the running course and y-axis indicates the running direction of the vehicle. The solid line shows positions of the magnetic detecting device 11 and vehicle 1 when the former is on the magnet Mi, and two-dot chain line shows positions of the magnetic detecting device 11 and vehicle 1 when the former is on the magnet Mj. $L_1$, $L_2$ indicate distances between the magnets Mj, Mi and the center of magnetic detecting device 11, which are obtained from the mean value $Z_1$. When angle formed between Y-axis and y-axis is $\theta_R$, a running distance of the vehicle after passing the magnet Mi till confirming the distance $L_2$ of the magnet Mi from the center of magnetic detecting device 11 is $L_{OV}$, and the position and distance on X-Y coordinates when the distance $L_2$ is confirmed are $R(X_R, Y_R)$ and $\theta_R$, $$\theta_R = \sin\{(L1-L2)/L\} \quad (5)$$

$$X_R = -L2 \cos \theta_R + L_{OV} \sin \theta_R \quad (6)$$

$$Y_R = Y_N - |L2|\sin|\theta_R| + L_{OV} \cos \theta_R \quad (7)$$

From these Equations (5), (6), (7), the position and direction can be obtained.

The running position and direction of the vehicle 1 decided successively by respective revolutions of the driving wheels 1l, 1r of the vehicle 1, are corrected to correspond to the more accurate running position R and direction $\theta_R$ of the vehicle 1 calculated separately in response to relative positions of the magnets Mi, Mj arranged at fixed points M on the running course Y-axis as aforementioned at the hall elements $S_1$ to $S_{64}$, thereby errors accumulated hitherto can be eliminated.

Specific running control circuits will be explained as follows.

Figure 7:
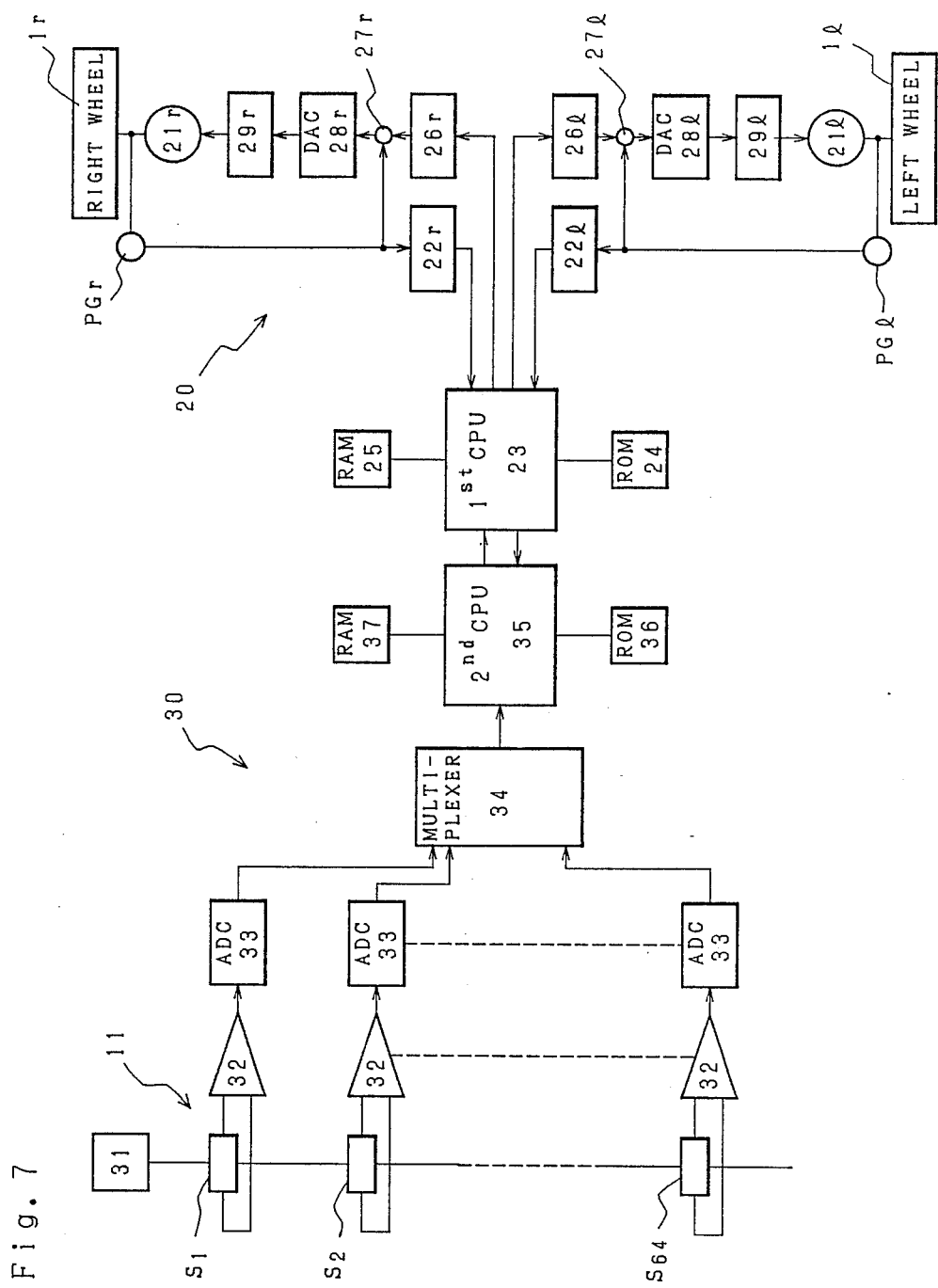
FIG. 7 is a block diagram showing running control systems according to the present invention.

FIG. 7 is a block diagram showing a running control system installed on the vehicle 1, wherein numeral 20 denotes a running control circuit and 30 indicates a detecting circuit.

Pulses produced at pulse generators PGl, PGr are taken into a directional operation CPU 23 (hereinafter merely referred to as the first CPU) through input interfaces 22l, 22r. The first CPU 23 counts the pulse according to the control program read from a ROM (read only memory) 24, and calculates the running position and direction of the vehicle 1 in real time to output the directional operation control signal. The control signal is outputted to subtractors 27l, 27r as the number of pulses through output interfaces 26l, 26r, and the signal corresponding to the difference between the number of pulses given from the pulse generators PGl, PGr as the feedback signal is inputted to motor 21l, 21r via D/A (digital/analog) converters 28l, 21r and amplifiers 29l, 29r, thereby revolutions of motors 21l, 21r are controlled separately to effect directional operation of the vehicle 1. A RAM (random access memory) is generally shown at 25.

While, the aforesaid hall elements $S_1$ to $S_{64}$ in the detecting circuit 30 are connected to a constant-current circuit 31 and energized in a constant direction continuously with a current, and each output voltage of which are amplified by the amplifiers 32, 32 . . . and taken into a reference value operation CPU 35 (hereinafter referred to as the second CPU) on the fixed point M through the A/D converters 33, 33 . . . and multiplexer 34. The second CPU 35, according to the control program read from the ROM 36, scans the hall elements $S_1$ to $S_{64}$ 10 times as aforementioned whenever the vehicle 1 approaches to and passes the magnets Mi, Mj, and in response to its output, determines the position in a direction orthogonal to the running direction of the vehicle which has passed the magnets Mi, Mj, and calculates the running position and direction of the vehicle 1 at the fixed point M in response to coordinates values of the magnets Mi, Mj on the running course read from the RAM 37 to output to the first CPU 23. The first CPU 23 is so designed that, when there is outputted from the second CPU 35 the running position and direction of the vehicle 1 detected in real time on the basis of the output value are corrected, and the motor 21l, 21r of the driving wheels 1l, 1r are controlled to bring the vehicle 1 to follow the running course newly set in response to the new corrected value.

Figure 8:
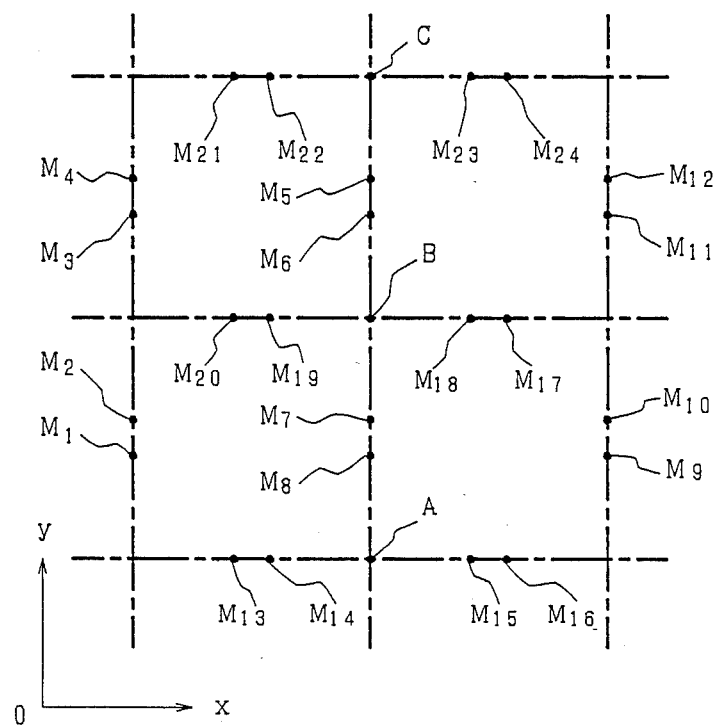
FIG. 8 is a plan view showing a portion of running courses of a vehicle.
Figure 9:
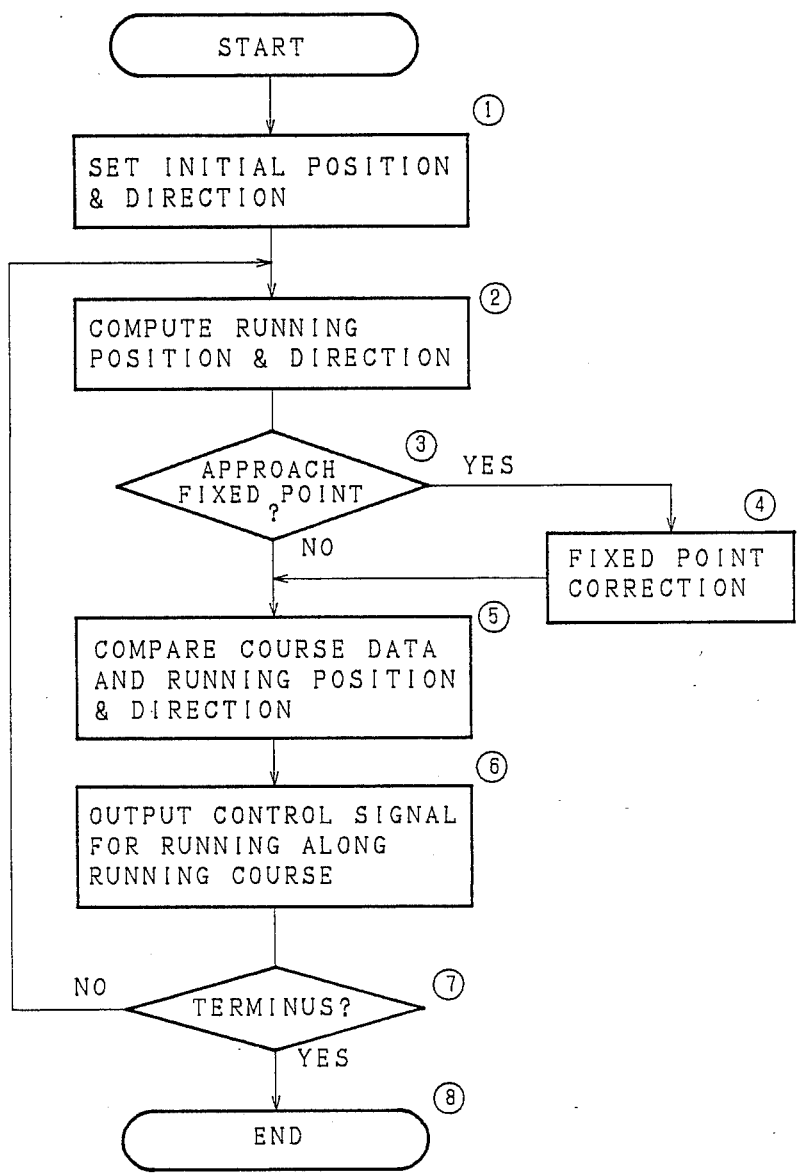
FIG. 9 is a flow chart showing the content of control of first CPU.
Figure 10:
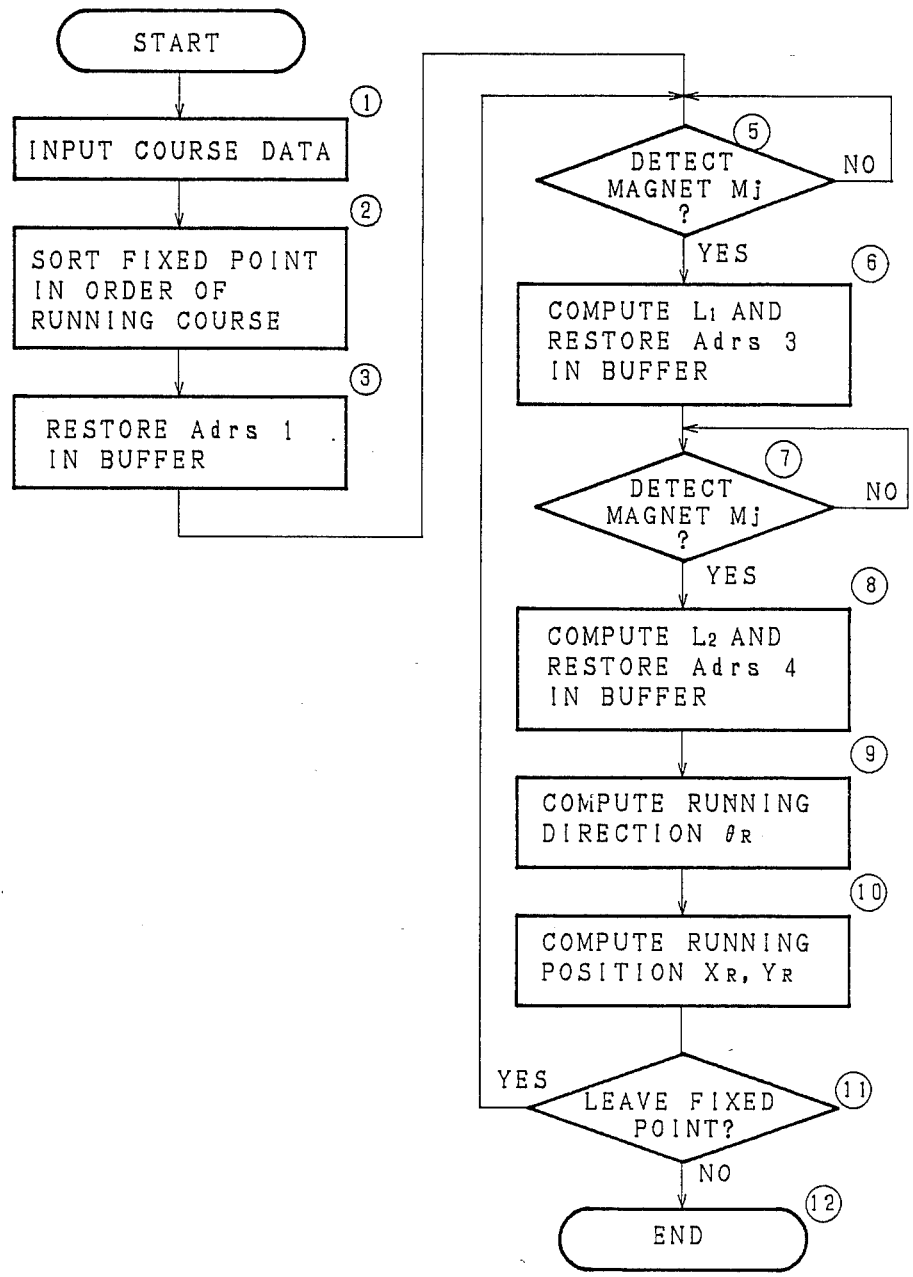
FIG. 10 is a flow chart showing the content of control of a second CPU.

FIG. 8 is a plan view showing a portion of running course of the vehicle 1, and illustrates directional operation control processes when running the vehicle 1 along the course A-B-C among the courses shown therein, together with a flow chart of the first CPU 23 shown in FIG. 9 and a flow chart of the second CPU 35 shown in FIG. 10. Assuming that the running courses in the whole plant are arranged like a chess board as shown in FIG. 8, an origin O is suitably selected in some point in the plant, and coordinates values of the magnets $M_1$ to $M_{24}$ at all fixed points M, M . . . on the running courses are decided in response to the two-dimensional coordinates of the abscissa x and the ordinate y and stored in the RAM 37 in the mode as shown in FIG. 11. FIG. 11 is a concept view showing the content of memory in the RAM 37, wherein the magnets $M_1$ to $M_{24}$ allocated to each address Adrs 1 to Adrs 24 and its x coordinates $x_{M1}$ to $x_{M24}$, y coordinates $y_{M1}$ to $y_{M24}$ are stored when running schedules of the vehicle 1 are decided and data related to its running course A-B-C such as the distance between $\overline{AB}$, $\overline{BC}$ or the running direction (straight line) are inputted to the second CPU 35 (Step 1 in FIG. 10), the magnets $M_5$ to $M_8$ at the fixed point M on the running course are read from the RAM 37, rearranged in running order and stored in the other region of the RAM 37, for example, in the mode as shown in FIG. 12 (Step 2 in FIG. 10). FIG. 12 is a concept view showing the content of memory in the RAM 37, wherein the magnets $M_8$ to $M_5$ allocated to each address Adrs 1 to Adrs 4 and its coordinates x and y are stored.

The content of Adrs 1 is stored in a buffer (Step 3 in FIG. 10). Then, the existing position or the initial position and direction of the vehicle 1 are inputted to the first CPU 23 (Step 1 in FIG. 9) to start running. As soon as start running, pulses produced from the pulse generators PG$l$, PG$r$ are counted by the first CPU 23 successively and the running position and direction of the vehicle 1 are calculated successively in real time from revolutions of the left and right driving wheels 1$l$, 1$r$ (Step 2 in FIG. 9) to determine whether the vehicle 1 has approached to the fixed point M (Step 5 in FIG. 9), when it has not approached to the fixed point M, the running course data (only straight running) read from the RAM 37 is compared with the running position and direction obtained by calculating in real time (Step 5 in FIG. 9) to calculate revolutions of the left and right driving wheels 1$l$, 1$r$ necessary for running along the running course, and to output control signals to respective motors 21$l$, 21$r$ (Step 6 in FIG. 9).

Then, it is determined whether the end or not (Step 7 in FIG. 9), if not, returns to Step 3 and repeats the process until the vehicle 1 approaches to the fixed point M.

While, in the second CPU 35, when the vehicle 1 starts running, it is determined whether the line of hall elements has detected the fixed point M at approaching timing of the vehicle 1 to the magnet M$_8$, in other words it is determined whether the line of hall elements has passed the magnet M$_8$ (Step 5 in FIG. 10), if the line of hall elements has passed above the magnet M$_8$, the position in a direction orthogonal to the moving direction of the vehicle is obtained to calculate L$_1$ and the content of next magnet M$_6$ is stored in the buffer (Step 6 in FIG. 10). Then, it is determined whether the line of hall elements has approached to the magnet M$_7$ (Step 7 in FIG. 10), when it is detected that it has arrived above the magnet M$_7$, the position in a direction orthogonal to the moving direction of the vehicle is obtained to calculate L$_2$ and the coordinates of magnet M$_7$ stored in the buffer is read, and the content of magnet M$_5$ at the next new fixed point M is stored in the buffer (Step 8 in FIG. 10). The running direction $\theta_R$ of the vehicle 1 at the fixed point M is calculated according to Equation (5) (Step 9 in FIG. 10), which is outputted to the first CPU 23 after calculating coordinates R(X$_R$, Y$_R$) of the distance L$_{OV}$ according to Equations (6), (7) (Step 10 in FIG. 10), and it is determined whether the fixed points M are still remained on the running course (Step 11 in Fig. 10), when it is not remained the control is finished (Step 12 in FIG. 10), and when it is remained returns to Step 5 to repeat aforesaid processes.

As described hereinabove, when the vehicle 1 approaches to the fixed point M and its line of hall elements passes above the magnets Mj, Mi and the position R(X$_R$, Y$_R$) and running direction $\theta_R$ of the vehicle 1 when its position is confirmed and calculated by the CPU 35, it is determined in the first CPU 23 that the vehicle 1 has approached to the fixed point M in Step 3 shown in FIG. 9, and the position R(X$_R$,Y$_R$) and running direction $\theta_R$ on which the vehicle 1 is based are taken in from the second CPU 35 and replaced with the running position and direction of the vehicle 1 detected in real time in response to revolutions of the left and right driving wheels 1$l$, 1$r$. By this replacing operation, accumulated errors of the running position and direction are eliminated (Step 4 in Fig. 9). On the basis of new running position and direction obtained by the replacement, which are again compared with the running course data read from the RAM 37 (Step 6 in FIG. 9), and the control signals are outputted to motors 21$l$, 21$r$ of the left and right driving wheels 1$l$, 1$r$ to eliminate the difference therebetween and to bring the vehicle 1 along the running course (Step 6 in FIG. 9). Then, it is determined whether the vehicle 1 has arrived at the end of running course or point C (Step 7 in FIG. 9), if it has arrived at the end of control is finished (Step 8 in FIG. 9), if it is not, returns again to Step 2 to calculated the running position and direction in real time according to the output based upon the pulse generators PG$l$, PG$r$, and the aforesaid processes are repeated.

In the present embodiment, through the configuration in which hall elements S$_1$ to S$_{64}$ are aligned at a fixed interval on the center portion of the vehicle 1 in a direction orthogonal to the moving direction of the vehicle is explained, the aligning position and the number of alignments are, in particular, not limited, for example, the aligning position may be at the front or rear end portions of the vehicle 1 and the alignments may be decided as required, since the more the alignments increase the more the detecting accuracy of relative positions between the magnets and vehicle is improved. In the present embodiment, though the configuration in which the hall elements S$_1$ to S$_{64}$ are disposed only at the center portion of the vehicle 1 is explained, they may be disposed in two locations either at the front end, center or rear end portions, in this case, the running position and direction of the vehicle 1 can be detected from each hall elements output when the lines of hall elements at two locations pass the magnet M, thus the number of magnets to be installed can be decreased. In the present embodiment, in order to eliminate divergences of hall element outputs, though the two-dimensional distribution is obtained by ternarizing the output, it may be obtained by binarizing.

In the present embodiment, though the unilateral region low limit value L1 and two-region low limit value L2 are used as region judging condition, taking into consideration of influences of noises or the like as the judging conditions of the presence of two regions, besides the two-region low limit value L2, when the window is shifted to the right end of each line, it may be judged as the presence of two regions even when U2 < L2, if relationships between appearance frequency U4 besides the low level data B on the right side of the window and the number of noises L7 allowable at the right end of the line satisfy U4 ≦ L7. It can also be judged that the region is not formed, when heterogeneous value appearance frequency U3 as the allowable noise condition of the region and the number of allowable noises L3 appears in the region is U3 < L3 and U1 < L1. Furthermore, in the present embodiment, in order to speed up image processings, though the center position is obtained only by judging sizes by movement of the window having a predetermined length, the present invention is not limited thereto and the center position may be obtained by exracting the pattern to obtain its center of gravity as the usual image processing.

Moreover, in the present embodiment, though two magnets are installed on the running course in the running direction of the vehicle, the present invention is not limited thereto and the magnets may be disposed in a direction intersecting the running direction of the vehicle so as to be detected to eliminate accumulated errors at fixed points.

As particularly described heretofore, in the present method and apparatus, since the magnetic field intensity of magnets disposed at fixed points on the running courses are detected in two-dimension by the magnetic detecting elements, characteristic deteriorations of the magnetic detecting elements and malfunctions attributable to cause such as damages and unstable outputs due to power fluctuations can be reduced, and at the same time, detecting accuracy of the magnetic detecting elements can be improved, thus accumulated errors at the fixed points are eliminated precisely and the stable and long distance automatic guided running can be accomplished.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A running control method of an automatic guided vehicle which runs as detecting the running position and direction, characterized by detecting the magnetic field intensity of magnets arranged at fixed points on running courses, said detecting being conducted several times at a predetermined timing with a plurality of magnetic detecting elements aligned in a direction intersecting the moving direction of the vehicle, to calculate at least a first running position and direction of the automatic guided vehicle in response to detected outputs over a plurality of times of conducting said detecting of each of said plurality of magnetic detecting elements, wherein at least said calculated running position includes a position calculated in a first dimension substantially along said moving direction and a second dimension substantially along said direction intersecting the moving direction, and to correct said running positions and directions so as to follow said running courses according to the calculated values.

2. A running control apparatus of an automatic guided vehicle which runs as detecting the running position and direction, comprising:
   a plurality of magnetic detecting elements aligned in a direction intersecting the moving direction of the vehicle for detecting the magnetic field intensity of magnets arranged respectively at fixed points on running courses;
   a detecting control portion which controls to detect said magnetic detecting elements for several times adjacent said magnets at a predetermined timing;
   a position calculating portion which converts the detected magnetic field intensity over a plurality of times of detecting by said plurality of magnetic detecting elements into a distribution pattern of moving direction of the vehicle and its intersecting direction, to calculate the running position and direction of said automatic guided vehicle in response to converted data, wherein at least said calculated running position includes a position calculated in a first dimension substantially along said moving direction and a second dimension substantially along said direction intersecting the moving direction; and
   an operation control portion which corrects said running position and direction so as to follow along said running courses.

3. A running control method as claimed in claim 1, wherein said calculation of the running position and direction comprises the steps of:
   ternarizing each magnetic detecting element output among high, medium, and low level at every said timing;
   scanning ternarized outputs in the aligned direction by using a window having a predetermined length in said direction;
   determining a region pair which comprises two regions of the ternarized output of equal level on the basis of ternarized output at both ends of said window;
   obtaining a shortest distance with respect to said two regions; and
   obtaining a center position of said two regions on the basis of said shortest distance.

4. A running control method, as claimed in claim 1, wherein said correction of said running positions comprises:
   obtaining a first running position of a first fixed point with respect to said automatic guided vehicle in said first dimension and said second dimension;
   obtaining a second running position of a second fixed point with respect to said automatic guided vehicle in said first dimension and said second dimension;
   using said first and second running positions to obtain a running direction;
   comparing said running direction to a predefined course; and
   correcting the running direction of said automatic guided vehicle based on said comparison of said running direction to said course.

5. A running control method, as claimed in claim 1, further comprising:
   obtaining a second running position in real time on the basis of automatic guided vehicle wheel rotation;
   comparing said first running position with said second running position; and
   eliminating accumulated errors by replacing said second running position with said first running position.

* * * * *

UNITED STATES PATENT AND TRADEMARK OFFICE
CERTIFICATE OF CORRECTION

PATENT NO. : 4,908,557

DATED : March 13, 1990

INVENTOR(S) : Masahiro Sudare, et al

It is certified that error appears in the above-identified patent and that said Letters Patent is hereby corrected as shown below:

On the title page Assignee should read --[73] Assignee:

Tsubakimoto Chain Co., Osaka, Japan.--

Signed and Sealed this

Ninth Day of March, 1993

Attest:

STEPHEN G. KUNIN

*Attesting Officer*  *Acting Commissioner of Patents and Trademarks*